M. L. TWOMLEY.
MACHINE FOR MAKING CORRUGATED BOARD.
APPLICATION FILED JULY 9, 1914.
1,313,844. Patented Aug. 19, 1919.
11 SHEETS—SHEET 4.
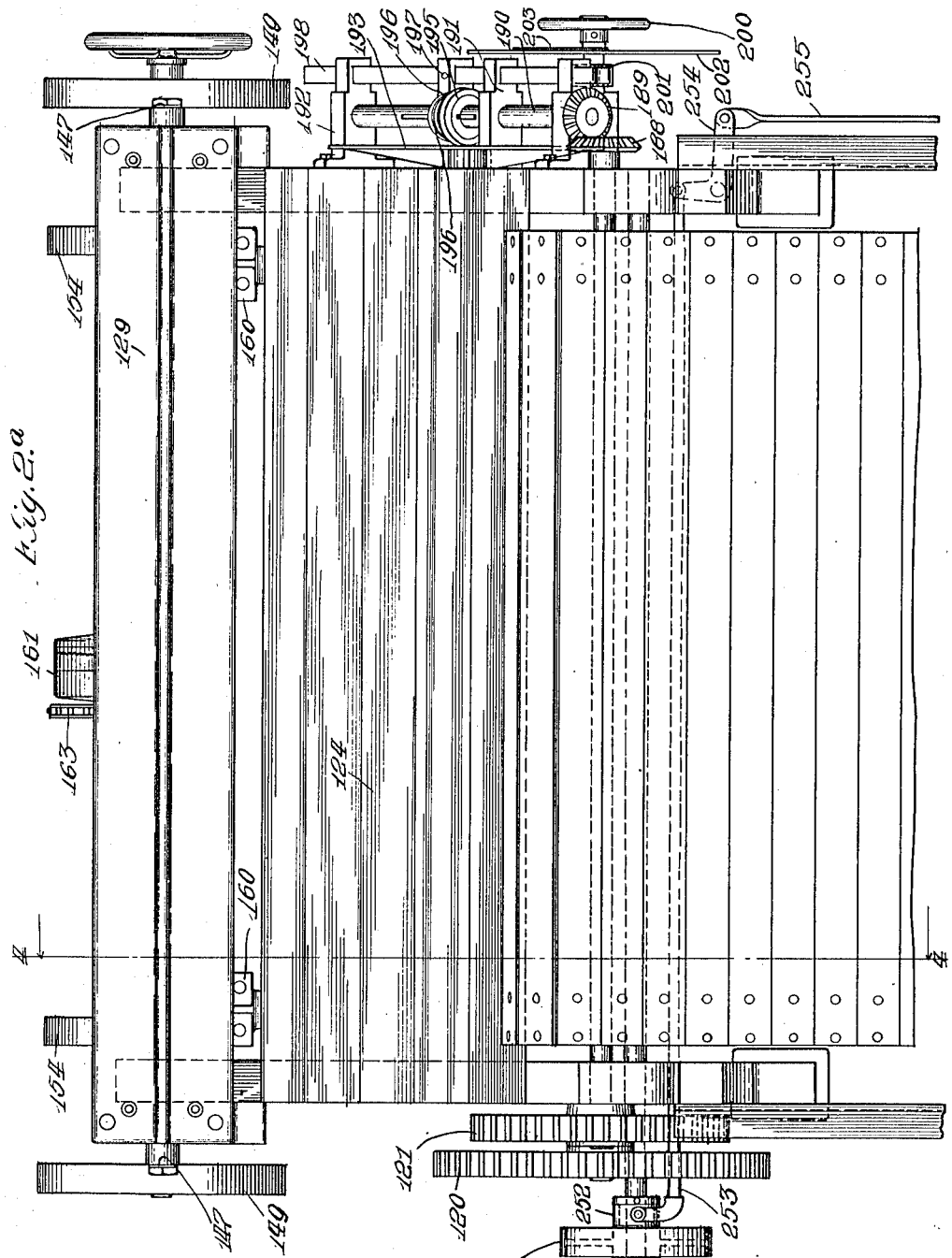

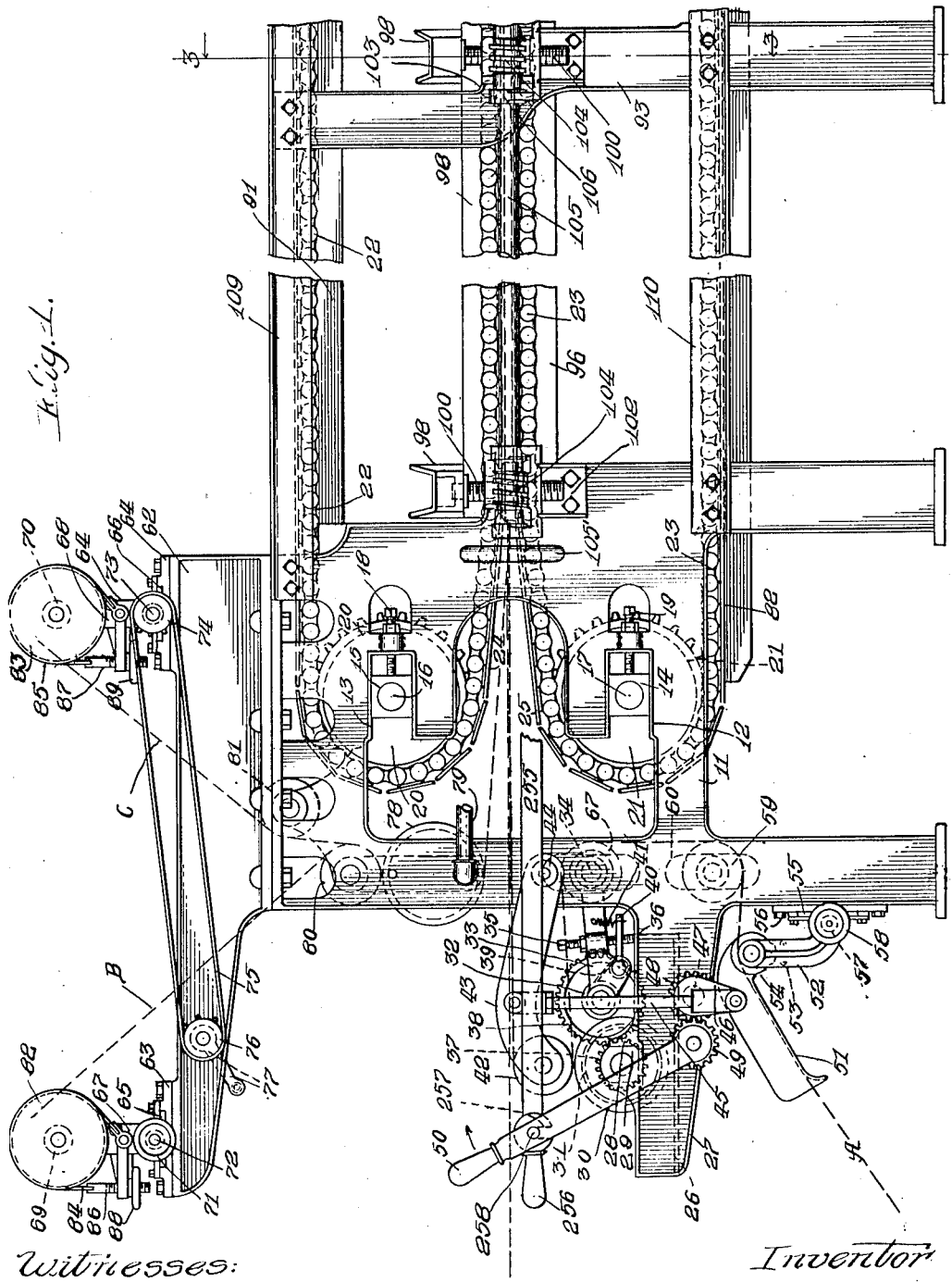

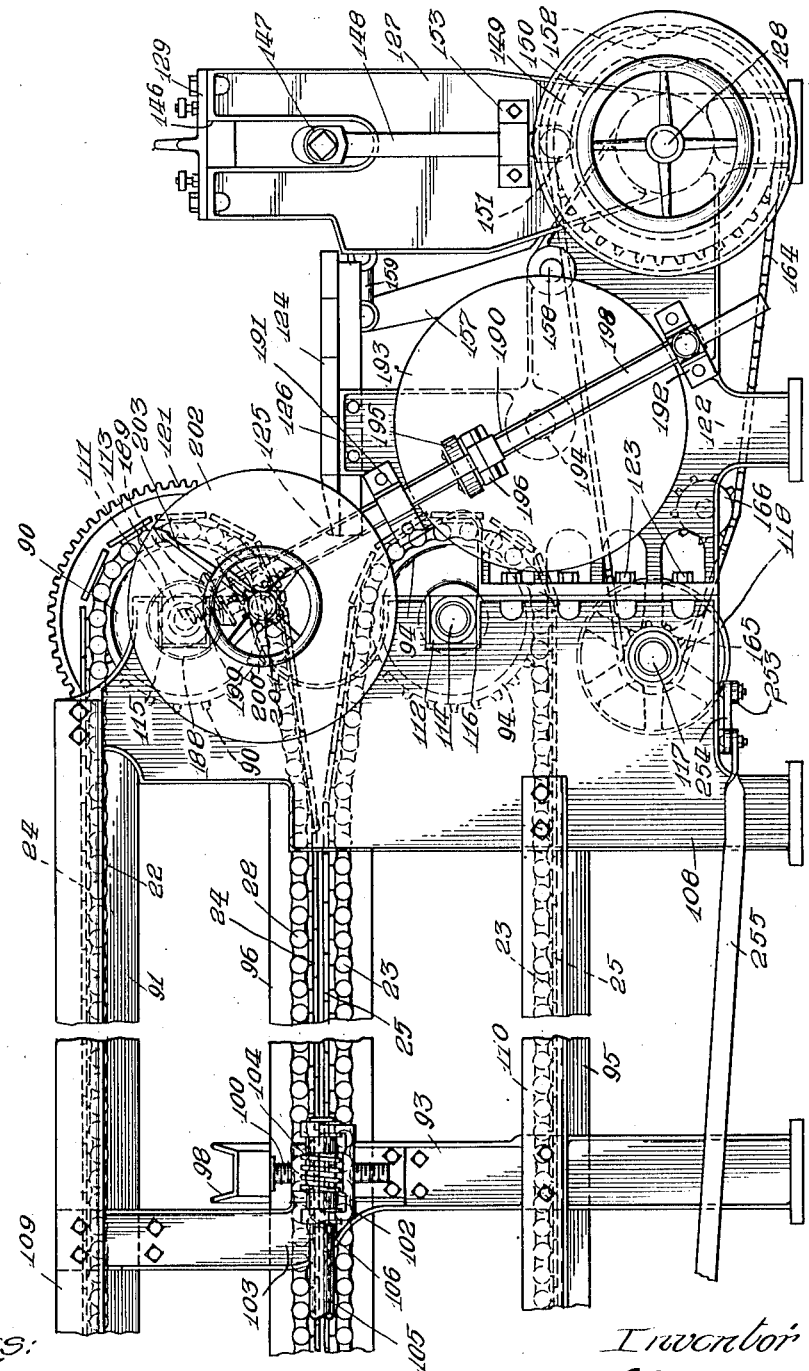

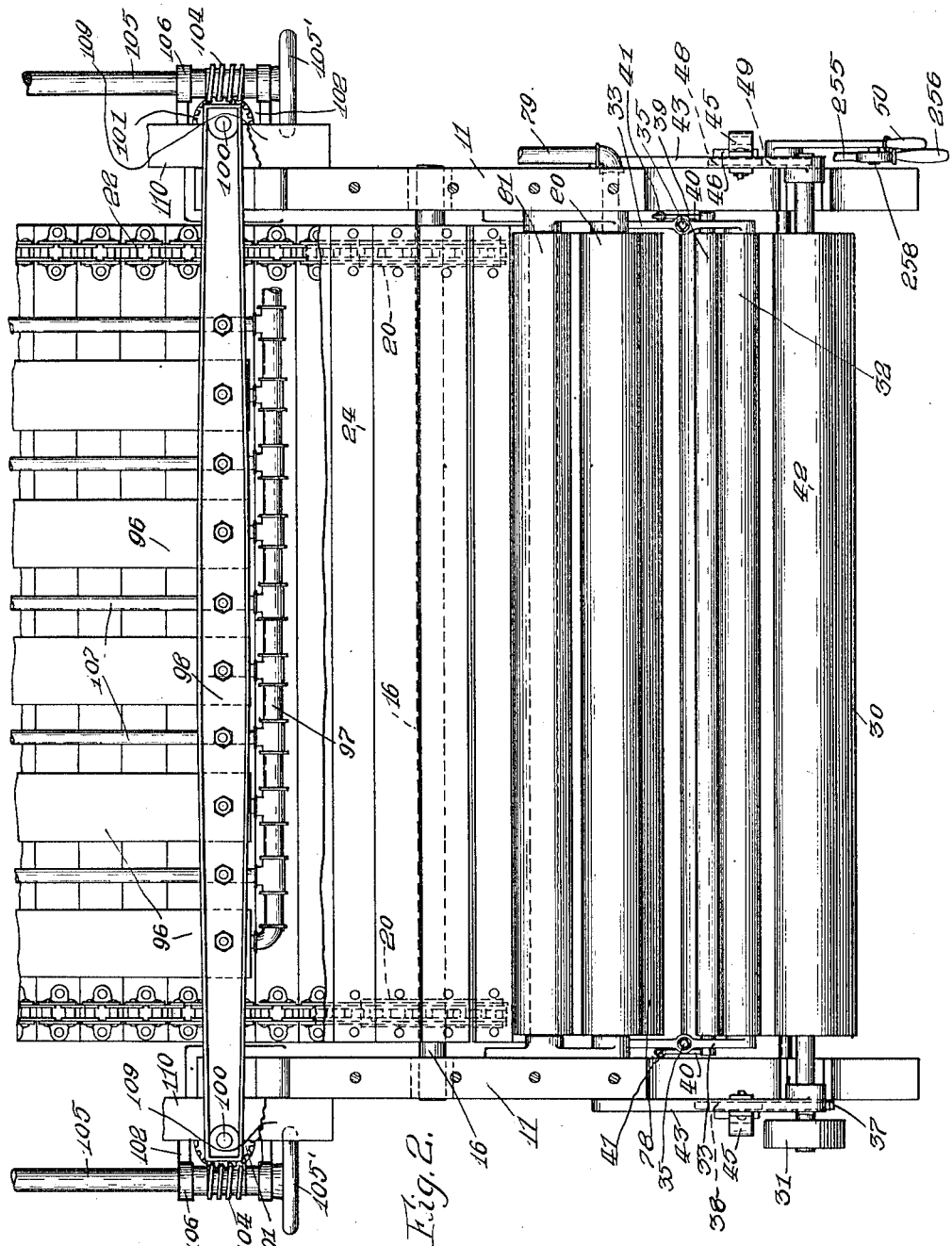

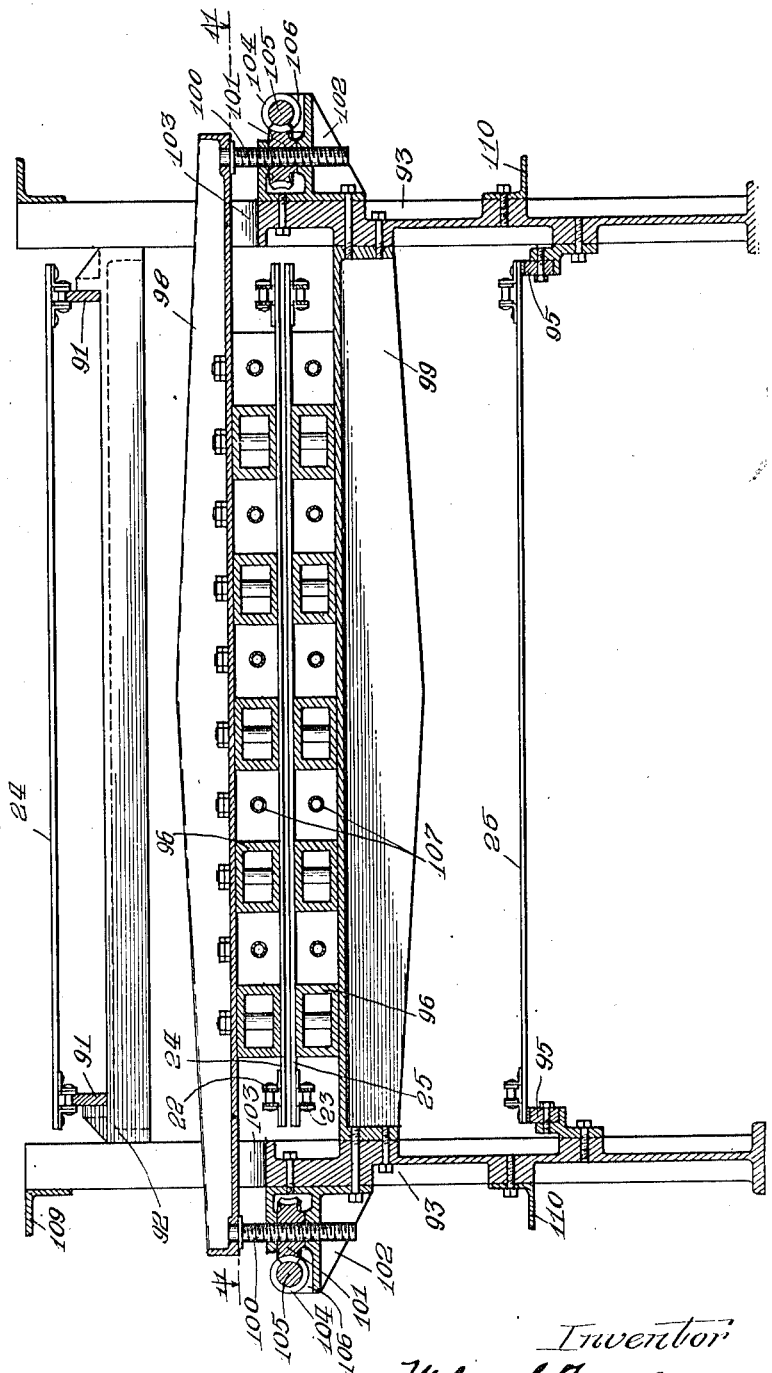

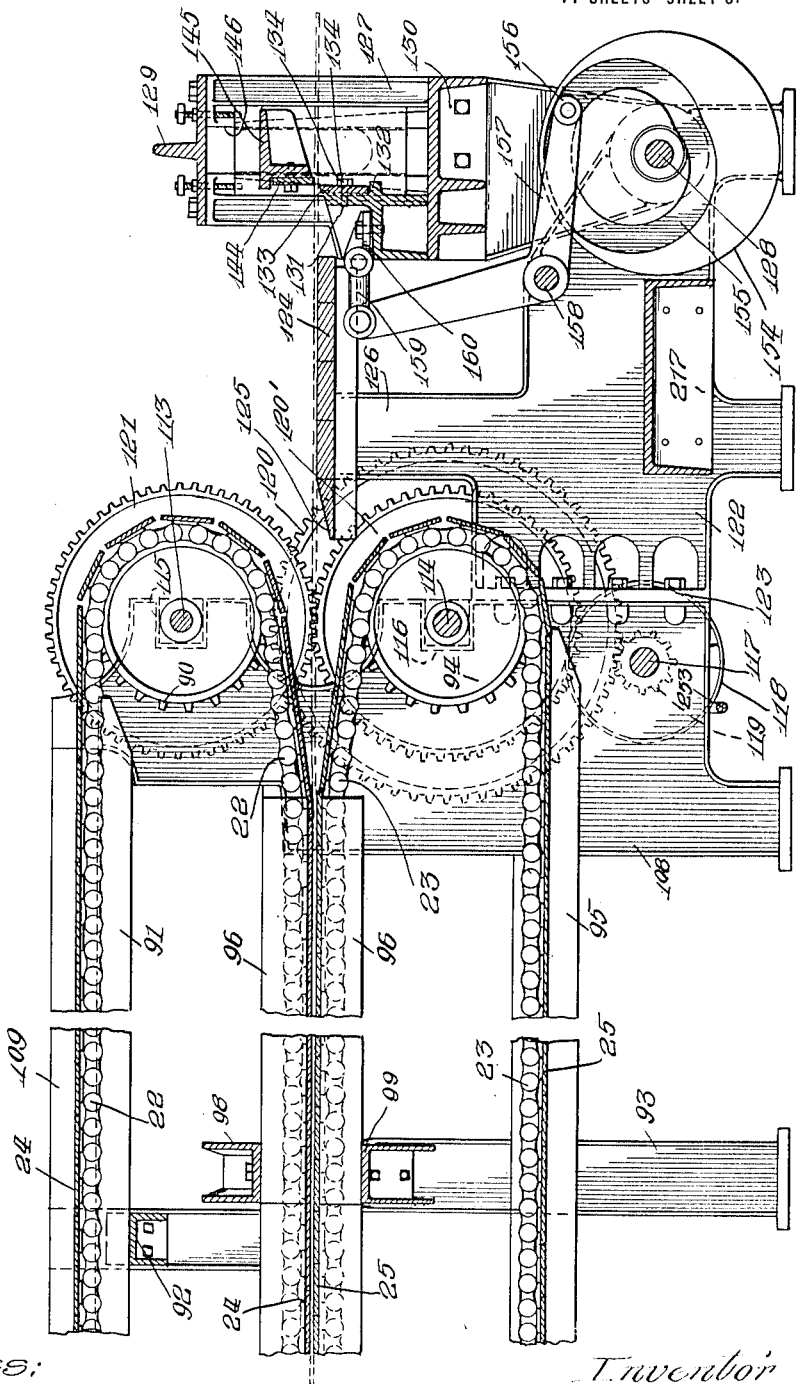

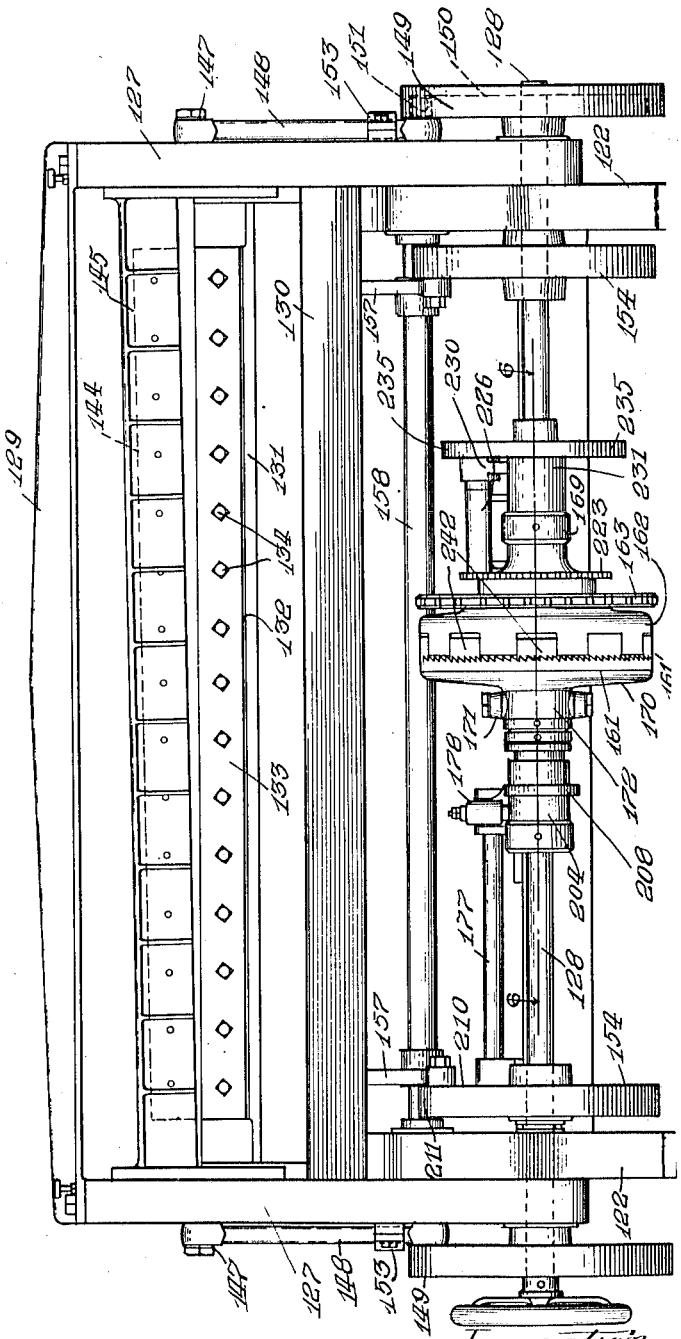

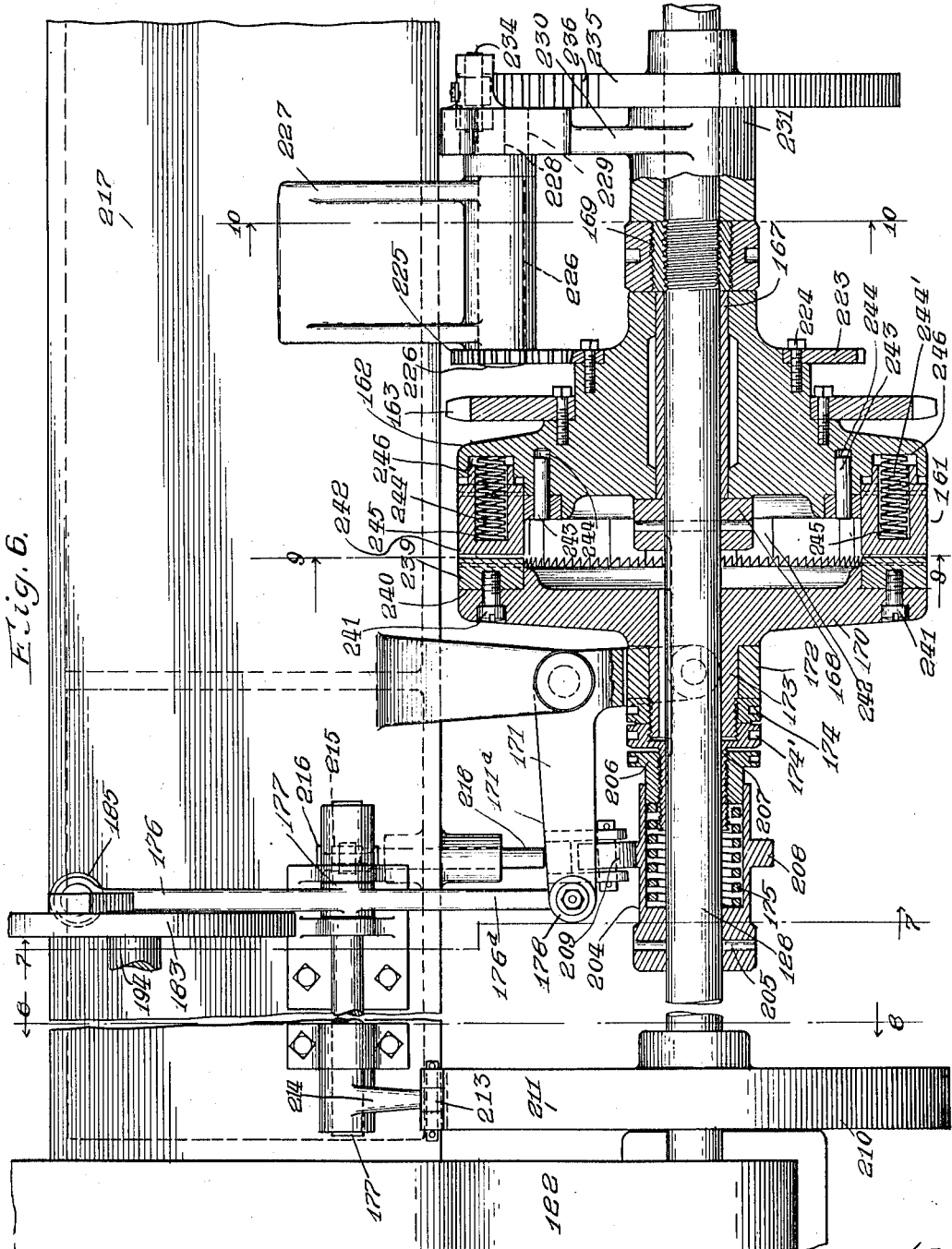

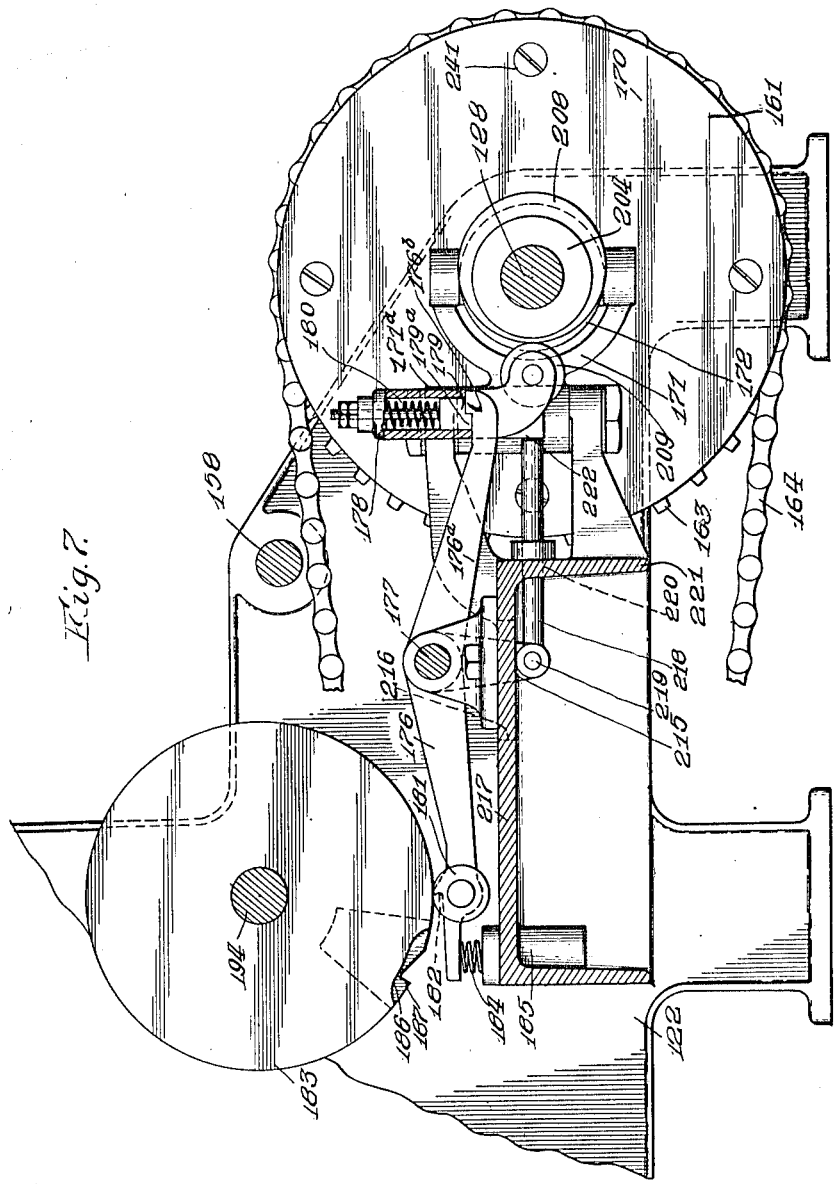

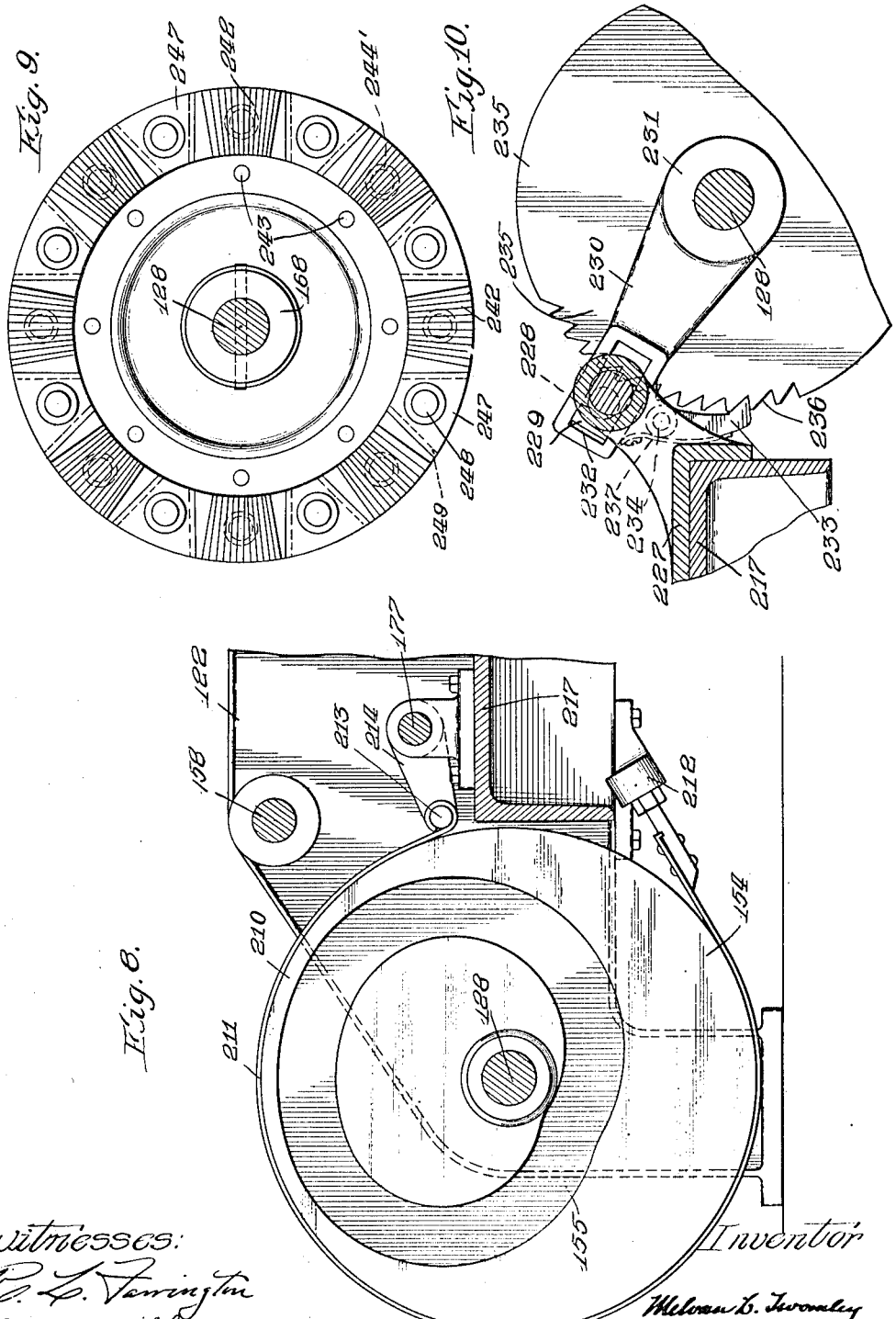

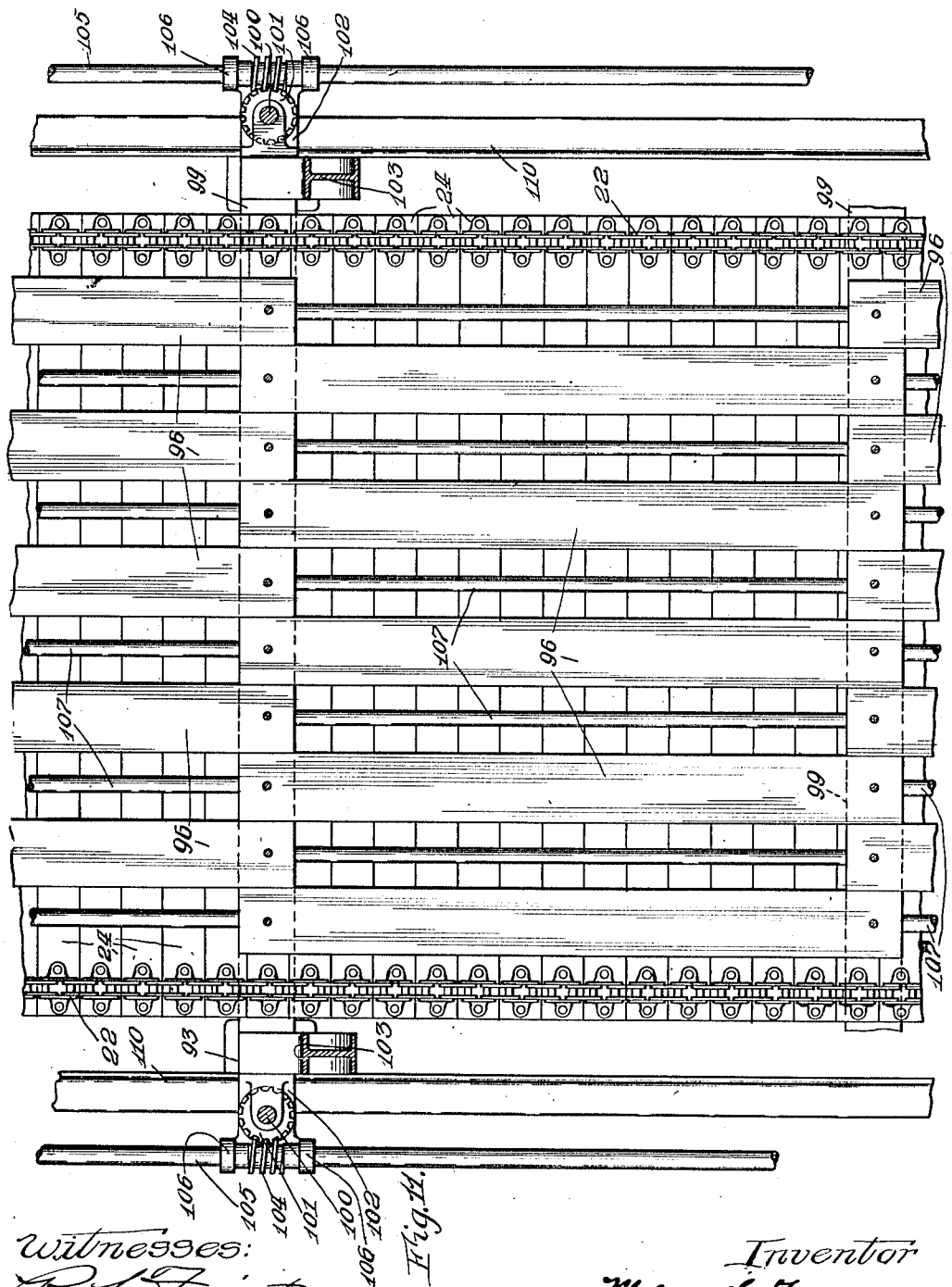

UNITED STATES PATENT OFFICE.

MELVAN L. TWOMLEY, OF CHICAGO, ILLINOIS, ASSIGNOR, BY MESNE ASSIGNMENTS, TO SEFTON MANUFACTURING CORPORATION, OF MILLBROOK, NEW YORK, A CORPORATION OF NEW YORK.

MACHINE FOR MAKING CORRUGATED BOARD.

1,313,844.      Specification of Letters Patent.      Patented Aug. 19, 1919.

Application filed July 9, 1914. Serial No. 849,952.

*To all whom it may concern:*

Be it known that I, MELVAN L. TWOMLEY, a citizen of the United States, residing at Chicago, in the county of Cook and State of Illinois, have invented certain new and useful Improvements in Machines for Making Corrugated Board, of which the following is a specification.

Double-faced corrugated board, which is a well-known article of commerce, consists of three sheets or plies of paper pasted together, the inner ply being corrugated or fluted throughout and the outer sheets or linings being cemented to the crowns of the corrugations upon relatively opposite sides of the intermediate sheet. Ordinarily this material is formed from the several sheets or strips of paper in two machines, in the first of which the intermediate sheet is corrugated and one of the lining sheets pasted upon one side thereof. The product of this initial operation is flexible and may be and is ordinarily wound in a continuous roll for convenience in feeding to the second machine. The latter, which is the machine to which the present invention more particularly relates, receives the material as prepared by the first machine, coats the exposed ridges or crowns of the corrugations with a suitable cementing material and applies the other lining sheet thereto. After the second lining sheet has been applied the board must be maintained in its ultimate form until the cement has set, for after setting the board is substantially rigid and cannot be warped or bent to any considerable degree without injuring or destroying it. Ordinarily the board is desired to be perfectly or substantially flat and therefore it is necessary that it be maintained in this condition after the application of the second lining sheet until the cement has set and is entirely dry or nearly so.

Machines have heretofore been devised for effecting this result but none of them is entirely satisfactory for the reason that they all either turn out an imperfect product, require the waste of part of the material or are slow in operation. The present invention is designed to correct these defects in the former machines of this character and my improved machine embodying the same is found to be a marked advance in these respects.

Since the product of this machine cannot be rolled or folded without injury it is necessary to cut the same in desired lengths as it comes from the machine. A further feature of my invention relates to a new construction of cutting means for severing the board into any desired lengths without buckling or otherwise injuring the same. It will appear from the following specification in connection with the accompanying drawings that the mechanism for forming the board may be used with other forms of cutting mechanism and that the improved cutting mechanism may be used with specifically different board-forming mechanism or indeed for other purposes which will suggest themselves, although these mechanisms were designed and are particularly adapted for conjoint use; it will likewise be apparent that many changes may be made in either section of the specific machine disclosed without departing from my invention, the specific disclosure being for the purpose of exemplification only and the scope of the invention being defined in the following claims in which I have endeavored to distinguish it from the prior art so far as known to me without, however, relinquishing or abandoning any portion or feature thereof.

In the accompanying drawings, referred to above, Figure 1 is a side elevation of the entering end of my machine and Fig. 1ª is a similar view of the outlet or exit end, the machine being shown as partly broken away to better exhibit the construction thereof; Fig. 2 is a plan view of the entering end of the machine as shown in Fig. 1 and Fig. 2ª a similar view of the outlet or exit end of the machine; Fig. 3 is a section upon the line 3—3 of Fig. 1; Fig. 4 is a substantially central vertical longitudinal section of the rear end of the machine on line 4—4 of Fig. 2ª; Fig. 5 is an end elevation of the outlet or exit end of the machine; Fig. 6 is a horizontal section partly broken away upon the line 6—6 of Fig. 5; Fig. 7 is a vertical longitudinal section upon the line 7—7 of Fig. 6; Figs. 8 and 9 vertical longitudinal sections of details to be described later in the specification; Fig. 10 a vertical longitudinal section on the line 10—10 of Fig. 6 looking in the direction of the arrow; and Fig. 11 a sectional plan view of the central portion of the machine.

The same character of reference is applied to each part throughout the drawings and specification.

Generally speaking the machine consists of a unitary strucure embodying three co-operating sections which are mounted upon a single continuous frame. The first of these sections comprises means for applying adhesive to the crowns of a corrugated strip of paper, means for feeding the corrugated strip of paper with a lining upon one side thereof to the device for applying adhesive thereto and means for guiding a second strip of paper to be cemented by the adhesive on the corrugations. The second or intermediate section of the machine comprises means for receiving the corrugated strip with the lining on one side and the adhesive on the other, and the second liner to be attached thereto, heating and drying and maintaining the board after it comes from the first section of the machine plane or straight until the cement has sufficiently set; and the third portion or section of the machine consists in mechanism for severing the board into any desired lengths after the cement has set and without warping or otherwise injuring the same.

Referring now more particularly to Figs. 1 and 2, the framework of the mechanism for delivering the strips of paper, pasting and cementing them together, comprises a pair of side castings 11 of suitable form which are provided with horizontal slideways 12—13 in which journal boxes 14—15 for receiving the ends of shafts 16—17 are adjustable by means of screws 18—19. The shafts 16—17 carry pairs of sprockets 20—21 respectively which receive the pairs of upper and lower chains 22—23 upon which the lagging 24—25 is mounted substantially as fully hereinafter described. The lagging forms a part of the second portion of the machine referred to above.

The means for applying cement to the corrugated paper comprises a cement tank or receptacle 26 which is mounted between and upon forward-extending brackets 27 formed upon the side frames 11. The upper edges of these brackets are shaped to provide housings 28 for journal boxes 29 in which is journaled a paste- or cement-applying roll 30. Rotation is given to this roll by a belt pulley 31, indicated in dotted lines in Fig. 1 from any suitable source of power. It will be understood that a pool of cement is maintained in the tank 26 into which the paste roll dips. In order to prevent too thick a layer of paste forming upon the roll or lumps or irregularities in the paste being carried up and into contact with the sheet of corrugated paper, a doctor roll 32 is mounted to maintain a uniform distance from the paste roll to permit only the required thickness of material to form upon the latter. For this purpose the roll 32 is journaled upon arms 33 pivoted at 34 to the journal of a roll to be presently described and said arms are provided with set screws 35 adapted to bear at 36 upon a stationary portion of the frame and by which set screws the distance of the roll 32 from the paste roll may be nicely adjusted. Upon the shafts of the paste roll and doctor roll 32 respectively are secured gears 37—38, gear 38, which is mounted upon the doctor roll, being of considerably larger diameter than gear 37 so that the doctor roll turns more slowly and thus has a wiping action with respect to the paste roll but constantly presents a new surface thereto. A scraping blade 39 is journaled in the arms 33 and yieldingly maintained in contact with the doctor roll by an arm 40 and spring 41. A roll 42 supports the strip to be coated in contact with the paste roll when the machine is in operation but in order that the material may be lifted out of engagement with the paste roll, as for example when the machine is to be stopped, said supporting roll 42 is mounted in arms 43 which are pivoted to the frame at 44. Links 45 on opposite sides of the machine are connected to the respective arms 43 at one end and at the other to crank arms 46 which are mounted upon a shaft 47 carrying pinion 48 located on the near side of the machine (in Fig. 1) and engaged by a pinion 49 which may be rotated by handle 50. By rotating the handle in the direction indicated by the arrow adjacent the same in the drawing the roll 42 may be raised away from the paste roll.

The course of the corrugated strip with the single lining applied thereto is indicated at A in dotted lines in Fig. 1. It first enters a chute 51 which is hinged to brackets 52 and angularly set with relation thereto by means of a thumb screw 53 engaging an arc 54 upon said chute. Brackets 52 are mounted upon a plate 55 which is received in transverse guides 56 upon the front of the machine and a worm 57 operated by hand-wheel 58 in an obvious manner serves to adjust the plate carrying the brackets transversely of the machine to secure proper alinement of the strip. From the chute 51 the material passes beneath a roller 59 which is journaled in boxes adjustable vertically in slots 60 in the frame of the machine and over a roller 61 likewise journaled in the frame and the journals on which receive the arms 33 above-mentioned. From the roller 61 the strip passes forwardly about the roller 42 where it is brought into contact with the paste-applying roll and thence it passes rearwardly directly into the bite of the lagging.

Upon the side frames 11 are bolted extension plates 62 which are provided at their front and rear ends respectively with guide plates 63—64 in which are mounted to slide plates 65—66 each carrying a standard 67—68 in which standards are mounted rolls 69—70 for the reception of rolls of lining which are to be applied to the corrugated board. The purpose of providing the two rolls and their supports is that when one of the rolls is exhausted the other may be put into service while the first-named roll is being replenished. A hand-wheel 71 is mounted upon a worm 72 which meshes with a suitable nut on each plate 65 for the purpose of accurately adjusting the roll laterally to feed its strip properly to the machine. Similar worm shafts 73 are used to adjust the plates carrying the rear roll standards but because of their inaccessibility a sprocket 74 is substituted for the hand-wheel and each connected by chain 75 with a sprocket 76 near the forward end of the machine which may be turned by a handle 77 secured to the sprocket shaft or journal thereof. A heating drum 78 is mounted between the frames 11 and supplied with steam through a pipe 79 and the lining sheet is guided about this drum before it is brought into contact with the corrugated sheet, and heated thereby. When the lining sheet is supplied from the forward roll it passes about a guide roll 80 and thence around the drum as shown in dotted line B to the bite or intake of the lagging. When the strip of lining is supplied from the rear roll it passes over guide roll 81, as shown in dotted line C, and under guide roll 80 whence its course thereafter is the same as when fed from the forward roll.

Each of the supply rolls 69—70 is provided at one end with a friction drum 82—83 with which a brake strap 84—85 coöperates and the tension of the latter may be adjusted by a screw 86—87 and hand wheel 88—89.

The lagging belts which receive between them the single-faced board and the second lining strip to be applied thereto are of considerable length and driven at a speed permitting the cement to set before the board leaves the same. The upper lagging belt, or more accurately speaking, the sprocket chains 22, the links of which severally carry the lags, are supported at their front ends upon the sprockets 20 above-mentioned, and at their rear ends upon similar sprockets 90. Intermediate the sprockets the upper reach of the upper lagging belt is supported upon longitudinal guides 91 which directly engage the sprocket chains and are themselves supported upon transverse bars 92 mounted upon uprights 93. (See Fig. 3). The lower sprocket chains 23 are similarly supported, at their forward ends by the sprockets 21 and at their rear ends by sprockets 94, the mounting of the latter of which will be described later. The lower reach of the lower lagging belt is supported upon longitudinal strips 95 which are supported by suitable brackets from the posts 93 before-mentioned. The adjacent reaches of the upper and lower lagging belts are guided between longitudinally-extending heating boxes 96 which are supplied with steam or other suitable heating fluid from a manifold 97. (See Fig. 2.) These heating boxes are arranged in sets, the members of each set being spaced apart, as shown in Figs. 2 and 2ª and extending between adjacent pairs of supports 93. The members of each set overlap at their ends the ends of members of the adjacent sets and extend between the same, as shown more particularly in Fig. 11. The overlapping ends of adjacent series are bolted or otherwise secured to transverse bars 98, 99, the lower of which are fixedly secured to the standards 93 between which they extend. The upper supports 98 are vertically adjustable being supported upon screws 100 which are so attached thereto as to prevent rotation and are threaded into worm wheels 101 which are suitably mounted or journaled in brackets 102 carried by the standards, which are offset at 103 to permit locating the adjustable supports directly above the main body of the post. The worm wheels 101 are engaged by worm sections 104 which are keyed or otherwise secured to longitudinally extending shafts 105 supported in bearings 106 upon the brackets 102 before mentioned, and said shafts 105, which are two in number, one upon each side of the machine, extend throughout the intermediate portion thereof and are provided or formed with hand-wheels 105' at their ends by which they may be rotated. Obviously by means of these longitudinal shafts the several cross pieces may be adjusted simultaneously according to the thickness of the corrugated board that is being turned out by the machine and the degree of pressure to which it is desired to subject the same. The number of sets or sections of heating boxes will, of course, depend upon the length of time for which the board is to be subjected to heat and the speed with which it is caused to travel through the machine, these various factors being in turn dependent upon the character and amount of the adhesive.

It will be seen by reference to Fig. 11 that the members of each longitudinal series of heaters are connected by pipes 107 which extend across the intervening gaps so that steam may be readily supplied throughout the entire upper and lower systems of heaters. The necessary range of adjustment of the upper sets of heaters is obviously small and where the heater supplying the steam is somewhat remote from the ends of the adjacent heating boxes the give of the piping will be sufficient to permit what adjustment is necessary. The lags passing between the heating systems are directly and entirely heated by the successive sets with which they come into contact, and though the members of the sets are spaced apart as above stated, the metal of the lags is sufficiently heat conductive to distribute the heat with sufficient uniformity, in view of the fact that the heat boxes of the successive sets are staggered so that the portions of the lagging which are not brought directly in contact with the members of one set are brought into contact with the heaters of the next set, and so on.

In order to provide an easy entrance to the bite of the lagging belts the forward sprocket wheels are spaced apart vertically and if desired or found necessary the front ends of the heat boxes may be cut away or eased off sufficiently to avoid catching upon the lagging belts.

For convenience of casting the framework for the mechanism at the rear end of the machine is formed at each side in two sections. The sectional side plates 108 are secured to the intermediate standards 93 and the front side plates 11 by longitudinal angle irons 109, 110. The journal boxes 111, 112 in which the shafts 113, 114 carrying the upper and lower pairs of sprocket wheels are respectively mounted are secured in housings 115, 116 formed in said castings. The power shaft 117 is likewise journaled in said castings and provided with a belt pulley 118 of ordinary character for driving the same. The power shaft is further provided with a gear wheel 119 meshing with the gear 120 upon the shaft 114 which carries the sprockets for the lower lagging belt and a gear 121 upon the shaft carrying the sprockets for the upper lagging belt engages gear 120 and is of the same diameter therewith. Thus the rotation of the power shaft drives the lagging belts but at a considerably reduced speed.

The side plates 122 for supporting the cutting or shearing mechanism are bolted at 123 to side plates 108. A table 124 with an inclined forward edge 125 is located in a position to receive the board as it comes from the lagging belts and is suitably supported upon upward extensions 126 of the side frames (see Fig. 1ª). The cutting mechanism proper is located just beyond this table. As the board is fed continuously, and it is practically impossible to perform the entire cutting operation instantaneously, it is necessary in order to avoid buckling the board that the shearing mechanism accompany or move at an equal speed with the board while the knives are in contact with the latter. For this purpose the entire shearing mechanism is mounted in a frame comprising a pair of side or cheek pieces 127 which are pivoted upon a shaft 128 which also has other offices to perform and is located at the lower rear end of the machine. The cheek pieces 127 are connected at their upper ends by a ribbed top plate 129 which is bolted to flanges upon said cheek pieces and the latter are also connected intermediate their ends by a shelf or brace 130. Between these cheek pieces is mounted a flanged knife support 131 which is formd on its rear face with a ledge or rib 132 to which the cutting blade proper 133 is fastened by bolts 134. The upper or movable knife comprises the usual blade 144 which is secured to a casting 145 the ends of which slide in ways formed in the cheek pieces (see Fig. 4). The cheek pieces are formed with ways or slots 146 extending downward from their upper edges through which extend wrist pins 147 for connection to the links 148 by which the knife is operated. The links 148 are reciprocated by cams upon the shaft 128 above mentioned which also carries cams by which the pivoted knife structure is oscillated to cause the knives to travel with the board. The cams 149 for reciprocating the knives are mounted upon the ends of shaft 128 and consist of disks keyed thereon having internal channels 150 (see Fig. 1ª) which receive antifriction rollers 151 mounted upon the ends of the respective links 148. As shown in Fig. 1ª the cam groove is concentric except for the limited portion 152 which is sharply inturned toward the center of the cam to give a short reciprocation to the knife. The links are prevented from other than a reciprocating movement by guides 153. The cams 154 for oscillating the knife structure as a whole are located immediately within the side frames 122 (see Fig. 5) and are formed with cam grooves 155 (see Fig. 4) which receive respectively rollers 156 upon bell cranks 157 pivoted to the side frames at 158. The upper arms of said bell cranks are connected by links 159 to brackets 160 bolted to the stationary knife support (see Fig. 4) so that the shearing mechanism is given an oscillation with each complete rotation of shaft 128.

Normally shaft 128 is at rest but it is provided with a clutch 161 one member of which is keyed to it and the other member loose on said shaft and constantly driven from the main drive shaft. For this purpose the constantly-driven member 162 has secured thereto a sprocket 163 (see Fig. 6) which is driven by a chain 164 passing around the same and around a sprocket 165 formed upon the drive shaft. An idler 166 is employed to maintain the chains in position. The driving member of the clutch is journaled at 167 upon shaft 128 (see Fig. 6) and prevented from longitudinal movement thereon by a pinned collar 168 and a screw collar 169. The driven clutch member 170 is keyed upon the shaft and reciprocated into and out of engagement with the driving clutch member by a bell crank lever 171 connected to a collar 172 journaled upon a reduced neck 173 on said driven clutch member and held in position thereon by nuts 174, 174'.

As heretofore stated the shaft 128 is normally at rest and only rotated when a length of the board is to be cut off. The clutch shifter by which the shaft is set in motion is controlled in its operation by adjustable means driven by the operating mechanism of the machine which may be so set as to cause to be cut off any lengths of material desired. For this purpose the bell crank 171 is normally restrained against the influence of spring 175 by which the clutch is thrown into engagement and to which reference will be made later by a latch 176 pivoted at 177 upon the frame. As seen in Fig. 7 the long arm 171ª of the bell crank is formed with a housing 178 for containing a follower 179 and a spring 180 by which the follower is depressed into contact with the shouldered end catch 176ᵇ of latch 176. The downward movement of the follower 179 is limited, however, so that a relatively slight downward movement of the latch releases it therefrom. The other end of the latch carries a roller 181 and catch shoulder 182 and is normally pressed into contact with a revoluble disk 183 by a spring 184 mounted in housing 185 in the frame of the machine. The disk 183 is provided with a depression 186 which receives the roller upon the latch and a notch 187 for the catch 182 so that when the depression and notch come opposite the roll and catch the spring 184 throws the corresponding end of the latch upward and arm 176ª downward and releases the bell crank 171 and as above stated the bell crank then permits the driven clutch member to be shifted under the influence of spring 175.

The rotation of the controlling disk 183 is accomplished in the following manner: The shaft 113 upon which the rear sprockets for the upper lagging belt are mounted is provided with a beveled pinion 188 which meshes with and drives a similar pinion 189 upon an inclined shaft 190 which is mounted in suitable bearings 191—192 attached to one of the end frames of the machine and outside the latter. The inclined shaft is parallel to the face of a friction disk 193 which is rigidly mounted upon the same shaft 194 to which the controller disk 183 is secured. A friction roller 195 is keyed to shaft 190 and adjustable longitudinally thereof toward and from the center of the friction disk so that by adjusting the roller respectively to the friction disk the speed of the latter may be adjusted. The friction roller is engaged by a collar 196 which is pinned at 197 to a shifting rod 198 the upper end of which is formed with teeth 199 constituting a rack. A hand-wheel 200 is journaled upon the side frame of the machine adjacent the rack and carries a pinion 201 in mesh with the latter so that by turning the hand-wheel the rack and shifting rod may be reciprocated to adjust the friction roller toward and from the center of the friction disk. For convenience in setting the speed of the friction disk a dial 202 is mounted concentric with the hand-wheel and the latter carries a hand 203 which moves over the dial. Obviously by rotating the hand-wheel the friction roller may be set to give any desired speed to the friction disk which in turn rotates the controller disk and through the latch controls the frequency of operation of the clutch shifter above described.

The spring 175 by which the driven member of the clutch is pressed into engagement with the driving member (see Fig. 6) is inclosed within a housing sleeve 204 which is pinned at 205 to the shaft and the pressure of the spring may be adjusted by a sleeve 206 threaded upon an extension 207 of nut 174'. In order to unshift the clutch after each operation of the shears the housing 204 is formed on its exterior with a cam 208 which coöperates with a roller 209 journaled upon the end 171ª of the bell crank lever, the cam being so formed and arranged as to thrust the arm 171ª outward on the completion of the operation of the shears. When the bell crank is first released by the depression of the catch 176 and the clutch moves into engagement the follower 179 moves to the right (as seen in Fig. 7) so that its extended end 179ª is above the raised or shouldered portion 176ᵇ of the latch. As soon, however, as the roller 181 on latch 176 is depressed by the further revolution of the controller disk 183 the follower 179 is driven upward in its housing against the spring 180. With the parts in this position when the bell crank is actuated by the cam 208 as above described the follower slides over the raised face 176ᵇ of the latch to the left (as seen in Fig. 7) until the projecting end thereof drops behind the shoulder on the latch which thereupon retains the bell crank against the pressure of spring 175 until the latch is again released by the controller disk. After the release of the driven clutch member and the shaft 128 to which it is keyed these parts continue to revolve under their inertia and unless provision were made to the contrary would come to rest at different points from time to time depending upon frictional and other conditions. It is essential, however, in order that the same length of board may be cut off at each operation of the shears that these parts be brought to rest at a predetermined point from which the succeeding operation of the device may begin. For this purpose I mount upon the shaft a friction disk 210 with which a friction strap 211 coöperates. This strap is secured at 212 to a fixed part of the machine and its other end is connected at 213 to an arm 214 mounted upon a rotary bolt 177, (see Figs. 6, 7 and 8), which has been heretofore referred to as the pivot of the latch 176 and upon which the latter is loosely mounted. The arm 214 is normally substantially horizontal and the bolt 177 carries a second arm 215 which is rigid therewith and depends through an opening 216 in the cross plate 217 forming a part of the framework of the machine. A push rod 218 is pivoted to said arm at 219 and is guided in an opening 220 in web 221 depending from said cross plate, and extends into the path of a depending portion 222 of the bell crank lever arm. It follows from this construction that when the bell crank lever is shifted by the cam 208 engaging the roller 209 thereon, the push rod 218 is also shifted and in a direction to lower the horizontal arm 214 and so bring the friction strap 211 into engagement with the disk 210 to stop the rotation of the shaft 128. Thus the shaft is not permitted to revolve under its inertia until the friction of the bearings brings it to rest but it is quickly stopped by the brake just described. Obviously, however, this mechanism is not sufficient to insure the shaft coming to rest in the same identical position each time though it may be depended on to stop said shaft within a comparatively limited arc. In order, therefore, that the succeeding movement of the shaft shall begin at a perfectly definite point I provide additional mechanism for feeding it forward to such point. For this purpose the driving member of the clutch 162 carries a gear 223 which is bolted to the outer face thereof at 224 and engages a pinion 225 the shaft 226 of which is journaled in the bracket 227 carried by the plate 217 above mentioned. The other end of the shaft 226 carries a pin or stud 228 (see Figs. 5, 6 and 10) eccentrically mounted with relation thereto and journaled in a slide block 229. An arm 230 is pivoted or journaled at 231 upon the shaft 128 and at its free end is formed with a guide slot 232 in which the slide block 229 above mentioned is free to reciprocate. Obviously, the continuous rotation of the pinion 225 by gear 223 through the eccentric pin and slot connection with the arm 230 just described oscillates the latter about its pivotal point. By suitably choosing the eccentricity of the stud 228 the extent of this oscillation can be determined. A pawl 233 is pivoted at 234 upon said arm and engages a ratchet wheel 235 which is rigidly mounted upon the shaft 128. The teeth 236 upon said ratchet do not however extend entirely around the periphery thereof as is usually the case in ratchet wheels but only for a very limited arc thereof which corresponds to or includes the entire arc within which the shaft may be stopped by the brake band above described. It will now be seen that when the clutch is unshipped and the shaft 128 left free it will be brought to rest or substantially so by the brake band above described or at least its inertia will be overcome thereby when the toothed portion of the ratchet is opposite said pawl. But though its tendency is to stop within the arc above described the pawl 233 operated by the connections just described acting on the ratchet teeth feeds the shaft around against the frictional resistance of the brake strap until the end of the series of teeth is reached when the pawl will simply oscillate back and forth without further movement of the shaft. Any suitable spring may be employed in connection with the pawl and I have shown an ordinary spring 237 secured to the arm and bearing upon the pawl.

In order that the engagement between the driven and driving parts of the clutch may be positive and yet the lost motion in the same be reduced to a minimum I employ a clutch of the following description: The driven member 170 thereof is provided upon its engaging face with a toothed annulus 239 secured in a rabbet 240 by screws 241 (see Fig. 6). The driving clutch member 162 is provided with a series of toothed sections 242 upon its engaging face, the teeth whereof are adapted to engage the teeth upon the driven section of the clutch. Each of these toothed sections is mounted for axial movement parallel to the axis of the shaft, that is to say, toward and from the toothed annulus upon the driven clutch member and is guided in such movement by one or more guide pins 243 extending into bores 244 in the body of the driving clutch member, and each said toothed section is urged in the direction of the opposing toothed annulus by a spring 244 housed in cavities 245—246 in the toothed sections and the body of the driving clutch member respectively. Such movement of the toothed sections under the influence of their respective springs is limited, however, by intermediate blocks 247 which are bolted to the body of the clutch member at 248 and undercut at 249 and overlie the edges of the adjacent toothed sections which are correspondingly rabbeted for this purpose. The teeth upon each such section correspond identically in size and distance between the edges thereof with the teeth upon the opposed annulus and diagonally opposite toothed sections are so formed and placed that when one of them is in driving engagement with the teeth of the annulus or in other words with the radial faces of its teeth in engagement with the radial faces of the teeth of the annulus, the other section of the pair is similarly engaged. Obviously, the toothed sections might be so arranged that all the teeth thereon throughout the periphery of the driving member of the clutch would be simultaneously in engagement with the teeth of the driven clutch member. In that event, however, whenever the engaging faces were brought together unless it chanced that the axial faces of the teeth were in position to engage each other there would be a certain lost motion before the engagement took place which might amount to the full width or arcuate dimension of a tooth. Obviously, though by the mechanism previously described the shaft were stopped at each operation in identically the same position, such lost motion between the members of the clutch would result in unequal lengths of board being cut. In order to reduce the lost motion in the clutch to a minimum the toothed sections are arranged in pairs, the members of each pair being diametrically opposite each other and the teeth of each pair being arranged to simultaneously engage the teeth upon the driven annulus; but the teeth upon the successive pairs of sections are slightly advanced or set back as the case may be with reference to preceding pair of sections so that they are in driving engagement when the angular relation of the clutch members is different from that at which the preceding pair of toothed sections engages to the extent of a fraction of a tooth. In other words, the space between the last tooth of one section and the first tooth of the succeeding section is not a multiple of the length of a single tooth but a fraction thereover. Preferably the advance or set back between successive pair of sections is such as to equally divide the arcuate length of the tooth between the several pairs of sections, on the clutch member. Thus, if, as in the example shown in Fig. 9, there are four pairs of toothed sections, each successive section is advanced or set back with relation to the preceding pair of sections a distance equal to one-quarter of a tooth. It follows that the lost motion between the clutch members can never exceed one-quarter of the arcuate length of a tooth. When the clutch members come together the pairs of sections whose teeth are most nearly in position for driving engagement interlock to the full depth of the radial faces of the teeth. The radial faces of the teeth of the other section are not in engagement nor can the teeth thereof enter to the full depth for this reason. Therefore the springs heretofore described are provided to permit the sections which are not in the driving position to retreat sufficiently to allow the driving sections full penetration.

The operation of the various parts of the machine have been set forth in connection with the description of the construction of said parts and it will be sufficient therefore to briefly describe the operation in general terms: The strip of material comprising the corrugated paper and the single lining sheet may be fed to the machine either from a supply roll or immediately from the machine heretofore referred to in which the intermediate sheet has been corrugated and the one lining sheet applied thereto. Entering the machine the material takes the course heretofore described and the adhesive is applied to the crowns of the corrugated paper by the paste roll whence it is fed immediately to the lagging belts. At the same time the sheet which is to form the other lining is fed from the supply rolls and having been heated by the drum about which it passes is likewise fed between the lagging belts and into contact with the cemented heads or crowns of the corrugations of the composite strip. The upper system of heating boxes is so adjusted with relation to the lower system of heating boxes that the board, now composed of three sheets is slightly compressed so as to force the last-applied lining sheet into close contact with the exposed cemented crowns of the corrugations but without crushing the corrugations. The belts of lagging are of such length as above described that they support the board in its flat condition until the adhesive is sufficiently set and the board sufficiently dried to maintain its permanent shape. The lagging not only forms a support for both sides of the board, in the construction disclosed, but it forms the intermediate heating means for conducting the heat directly from the steam boxes and distributing it throughout the board and thus hastening the setting of the same and the drying of the product. The continuous strip of board so formed is fed by the lagging to the shearing part of the machine which has previously been set by the hand-wheel 200 heretofore described to cause operations of the movable shear blade at suitable intervals to give the desired length of board. The latter moves continuously through the shears and between the blades thereof until the control disk 183 releases the latch 176. The latter then releases the bell crank 171 permitting the clutch to be shipped by the spring 175. By reason of the construction heretofore described the members of the clutch engage positively and without material lost motion whereupon the shaft 128 is revolved and the cams thereon cause the movable blade of the shears to be reciprocated to sever the board and to feed the shearing means forward along with the board *pari passu* so that the sheet of material is not buckled. Any suitable provision may be made for carrying away and stacking the product of this apparatus.

The power or drive shaft 117 is provided with driving and idle belt pulleys 250, 251 and a clutch 252 of any usual or approved design, which latter may be operated by a rod 253 which in turn is controlled by a bell crank 254 and a hand-rod 255 extending to the front of the machine. It is there provided with a handle 256 and a notch 257 by which latter it may be made to engage with a pin 258 upon the handle 50 so that the latter and the clutch rod may be operated together.

Obviously by means of the steam boxes directly in contact with the metal lagging between which the corrugated board is compressed the latter may be quickly heated to as high a temperature as may be desired which ordinarily would be as high as is possible without injury to the board so that the latter may be dried as quickly as possible and the machine be run at a comparatively high speed without impairing the quality of the product. As distinguished from machines in which the board is drawn between heaters by a carrier located beyond the latter, my machine saves the length of material which heretofore had to be wasted in order to start each new piece through the heating means and into the grip of the carrier. Furthermore, since the entire mechanism in contact with the board moves with it there is no danger of tearing or mutilating the product. The precise length of sections desired may be cut off by properly setting the shears and without buckling or in any manner injuring the board.

I claim:

1. In a machine of the class described, a paste roll, means for receiving a strip to which paste has been applied and attaching a liner thereto, means for guiding a strip into contact with said paste roll and thence to said receiver and liner-applying means, means for adjusting said guiding means to carry a strip thereon into and out of contact with said paste roll, means for starting and stopping said liner-applying means and hand-operated means common to said adjusting means and said starting and stopping means.

2. In a machine of the class described, a paste roll, a supporting roll adjustable toward and from said paste roll, means for receiving a strip from said supporting roll and a lining strip, means for pressing the two strips together, means for moving said supporting roll into and out of operative position with respect to the paste roll, driving means for the pressing means, a clutch between said driving and pressing means and operated means for shifting the clutch and operated means for adjusting the supporting roll and detachable connections between said operating means.

3. In a machine of the class described, means for pressing two strips of material together, means for distributing paste upon one of said strips, means for feeding the last said strip to the pasting means and from the latter to the pressing means, a pair of magazine rolls each adapted to receive a roll of lining paper, a heating drum common to both said magazine rolls and about which the lining strip is carried prior to its delivery to the pressing means.

4. In a machine of the class described, means for pasting the crowns of a corrugated strip of paper, means for feeding such strip to the pasting means, a pair of belts of lagging of heat-conducting material adapted to receive the material from the pasting means and to move therewith without substantial movement relative thereto and upper and lower heating means in conductive relation to said belts between which said lagging belts run and by which they are directly heated.

5. In a machine of the class described, means for pasting the crowns of a corrugated strip of paper, means for feeding such strip to the pasting means, a pair of belts of lagging of heat-conducting material adapted to receive the material from the pasting means and to move therewith without substantial movement relative thereto and heating means comprising steam boxes arranged longitudinally of said belts and between which said belts run and by which they are directly heated.

6. In a machine of the class described, means for pasting the crowns of a corrugated strip of paper, means for feeding such strip to the pasting means, a pair of belts of lagging of heat-conducting material adapted to receive the material from the pasting means, means for feeding a strip of lining paper to said corrugated strip and between the belts therewith, a series of sets of heating boxes arranged in contact with one of said belts and comprising longitudinally-extending heating boxes spaced apart laterally of the belts.

7. In a machine of the class described, means for pasting the crowns of a corrugated strip of paper, means for feeding such strip to the pasting means, a pair of belts of lagging of heat-conducting material adapted to receive the material from the pasting means between them, means for feeding a strip of lining paper between the belts upon the corrugated strip, a heating system for one of the belts comprising a series of sets of heating boxes, the members of each set being spaced apart laterally of the belts and the members of succeeding sets overlapped and interleaved at their adjacent ends.

8. In a machine of the class described, means for pasting the crowns of a corrugated strip of paper, means for feeding such strip to the pasting means, a pair of belts of lagging of heat-conducting material adapted to receive the material from the pasting means between them, means for feeding a strip of lining paper between the belts upon the corrugated strip, a heating system for one of the belts comprising a series of sets of heating boxes, the members of each set being spaced apart laterally of the belts and the members of succeeding sets overlapped and interleaved at their adjacent ends and a manifold for supplying steam to said boxes.

9. In a machine of the class described, means for pasting the crowns of a corrugate strip of paper, means for feeding such strip to the pasting means, a pair of belts of lagging of heat-conducting material adapted to receive the pasting strip from the pasting means, means for feeding a strip of lining paper to the lagging belts and upon the strip of corrugated paper, stationary means for heating the upper run of the lower belt in contact therewith and heating means for the lower run of the upper belt adjustable toward and away from the first said belt.

10. In a machine of the class described, means for pasting a corrugated strip of paper, a pair of belts of lagging, means for feeding the strip of corrugated paper and a strip of lining paper between said belts of lagging, a stationary heating means in contact with one of said belts, a vertically adjustable heating means in contact with the other of said belts and adjustable with relation to the first said belt, means for adjusting the latter said belt vertically comprising a set of screws, worm wheels in said screws and worm shafts extending longitudinally of the machine on opposite sides thereof and in engagement with said worm wheels.

11. In a machine of the class described, a pair of lagging belts arranged one above the other, heating boxes arranged upon opposite sides of and in contact with the adjacent runs of such belts and longitudinally thereof and means for feeding a pasted corrugated strip and a lining strip to said belts.

12. In a machine of the class described, continuously operating strip forming means, a means for severing the material as it is formed into uniform lengths, power means for driving the strip forming means and shears, connections between the power means and shears comprising a normally open clutch, constantly driven means for closing the clutch, and means for normally maintaining the clutch open to permit it to be closed at predetermined intervals.

13. In a machine of the class described, continuously operating strip forming means, a means for severing the material as it is formed into uniform lengths, power means for driving the strip-forming means and shears, connections between the power means and shears comprising a normally open clutch, means for closing the clutch, timing means constantly driven by the power means, and a latch controlled thereby for normally maintaining the clutch open but periodically permitting it to close.

14. In a machine of the class described, continuously operating means for forming a continuous strip of material, means for severing the strip into predetermined lengths comprising a shears, driving means common to the strip-forming means and the shears, connections between the driving means and the shears comprising a normally open clutch, a clutch shifter, a latch normally restraining the operation of the clutch shifter, a timing mechanism driven from the driving means, said latch controlled by said timing means to normally oppose the clutch shifter but permit it to operate at predetermined intervals.

15. In a machine of the class described, continuously operating means for forming a continuous strip of material, means for severing the strip into predetermined lengths comprising a shears, driving means common to the strip-forming means and the shears, connections between the driving means and the shears comprising a normally open clutch, a clutch shifter, a latch normally restraining the operation of the clutch shifter, a timing mechanism driven from the driving means, means for adjusting the speed of the timing mechanism, and a latch controlled by said timing means to normally oppose the clutch shifter but permit it to operate at predetermined intervals.

16. In a machine of the class described, continuously operating means for making a continuous strip of material, means for severing the strip into predetermined lengths comprising a shears, driving means common to the strip-forming means and shears, connections from the driving means to the shears comprising a normally open clutch, a clutch shifter, a latch normally maintaining the clutch in open position, and a controller disk driven from the driving means and normally maintaining the latch in operative position but designed to release the same at regular intervals.

17. In a machine of the class described, continuously operating means for making a continuous strip of material, means for severing the strip into predetermined lengths comprising a shears, driving means common to the strip-forming means and shears, connections from the driving means to the shears comprising a normally open clutch, a clutch shifter, a latch normally maintaining the clutch in open position, and a controller disk driven from the driving means and bearing upon the latch to normally maintain it in operative position but notched to permit the latch to move to inoperative position at predetermined intervals.

18. In a machine of the class described, continuously operating means for making a continuous strip of material, means for severing the strip into predetermined lengths comprising a shears, driving means common to the strip-forming means and shears, connections from the driving means from the shears comprising a normally open clutch, means for closing the clutch, a latch normally retaining the clutch in open position, a controller disk continuously driven from the driving means, and operating connections between said disk and driving means comprising means for varying the relative speed of the driving means and disk.

19. In a machine of the class described, continuously operating means for making a continuous strip of material, means for severing the strip into predetermined lengths comprising a shears, driving means common to the strip-forming means and shears, connections from the driving means to the shears comprising a normally open clutch, means for shifting the clutch to closed position, a latch normally maintaining the clutch in open position, a controller disk normally maintaining the latch in operative position but permitting it to retreat therefrom at regular intervals, means for driving the controller from the driving means, comprising a friction disk and a friction roller, the latter being adjustable toward and from the center of the friction disk, and means for adjusting the roller.

20. In a machine of the class described, continuously operating means for making a continuous strip of material, means for severing the strip into predetermined lengths comprising a shears, driving means common to the strip-forming means and shears, connections from the driving means to the shears comprising a normally open clutch, means for shifting the clutch to closed position, a latch normally maintaining the clutch in open position, a controller disk normally maintaining the latch in operative position but permitting it to retreat therefrom at regular intervals, means for driving the controller from the driving means, comprising a friction disk, a shaft parallel to the plane of the friction disk and geared to the driving means, a friction roller keyed to the shaft and adjustable toward and from the center of the disk, and means to adjust said roller.

21. In a machine of the class described, continuously operating means for making a continuous strip of material, means for severing the strip into predetermined lengths comprising a shears, driving means common to the strip-forming means and shears, connections from the driving means to the shears comprising a normally open clutch, means for shifting the clutch to closed position, a latch normally maintaining the clutch in open position, a controller disk normally maintaining the latch in operative position but permitting it to retreat therefrom at regular intervals, means for driving the controller from the driving means, comprising a friction disk, a shaft parallel to the plane of the friction disk and geared to the driving means, a friction roller keyed to the shaft and adjustable toward and from the center of the disk, means to adjust said roller consisting of a rack parallel to said shaft and adjustable longitudinally thereof and connected to the roller, and a hand wheel having a gear meshing with the rack.

22. In a machine of the class described, continuously operating means for making a continuous strip of material, means for severing the strip into predetermined lengths comprising a shears, driving means common to the strip-forming means and shears, connections from the driving means to the shears comprising a normally open clutch, means for shifting the clutch to closed position, a latch normally maintaining the clutch in open position, a controller disk normally maintaining the latch in operative position but permitting it to retreat therefrom at regular intervals, means for driving the controller from the driving means, comprising a friction disk, a shaft parallel to the plane of the friction disk and geared to the driving means, a friction roller keyed to the shaft and adjustable toward and from the center of the disk, means to adjust said roller consisting of a rack parallel to said shaft and adjustable longitudinally thereof and connected to the roller, a hand wheel having a gear meshing with the rack, a dial, and a pointer for indicating the adjustment of the rack.

23. In a machine of the class described and in combination with means for continuously producing a continuous strip of material, shears for severing the material into predetermined lengths, comprising a transverse shaft, an oscillatory frame mounted on the shaft, a stationary and a reciprocating knife mounted on the frame, a pair of cam disks mounted on and driven by the shaft for reciprocating the movable shear blade and a cam disk also mounted upon and driven by said shaft, and connections therefrom for oscillating the frame.

24. In a machine of the class described and in combination with means for continuously forming and feeding a continuous strip, an oscillating shears comprising an oscillating frame, a stationary and a reciprocating knife mounted thereon, means for reciprocating the knife comprising a shaft, cams mounted on the shaft, and links connecting the movable knife blade and cams, a cam for oscillating the frame, and a lever driven by said cam and connected to the frame.

25. In a machine of the class described, and in combination with means for continuously forming and feeding a continuous strip of material, a movable shears normally inoperative, continuously operating driving means, means for connecting the shears at intervals to the driving means, comprising a clutch, a shaft upon which the clutch is mounted and which is connected to the shears for operating the same, said clutch comprising a driving and a driven member, the latter adjustable longitudinally of the shaft, spring means for pressing the driven member of the clutch into operative connection with the driving member, a lever for controlling the shiftable member of such clutch connected thereto, a latch for normally maintaining the lever in a position with the clutch open, a controller normally maintaining the latch in a position to hold the clutch open but shaped to permit the clutch to close at intervals, and connections from driving the controller from the driving means.

26. In a machine of the class described, and in combination with means for continuously forming and feeding a continuous strip of material, a movable shears normally inoperative, continuously operating driving means, means for connecting the shears at intervals to the driving means, comprising a clutch, a shaft upon which the clutch is mounted and which is connected to the shears for operating the same, said clutch comprising a driving and a driven member, the latter adjustable longitudinally of the shaft, spring means for pressing the driven member of the clutch into operative connection with the driving member, a bell crank lever connected to the shiftable member of the clutch, a latch normally restraining the lever to hold the shiftable clutch member in open position, a controller continuously driven from the driving mechanism normally maintaining the latch in open position, releasing it at intervals, and a cam mounted upon the shaft and engaging the lever for restoring the latter and the clutch to open position.

27. In a machine of the class described, means for continuously forming a continuous strip of material, a shears for severing the strip into sections of equal length, driving means, a connection between the shears and the driving means comprising a normally open clutch having a driving member and a driven member, the latter of which is movable toward and from the driving member, means for shifting the driven member into and out of engagement with the driving member, and means for accurately positioning the driven member of the clutch after each operation of the shears.

28. In a machine of the class described, means for continuously forming a continuous strip of material, a shears for severing the strip into sections of equal length, driving means, a connection between the shears and the driving means comprising a normally open clutch having a driving member and a driven member, the latter of which is movable toward and from the driving member, means for shifting the driven member into and out of engagement with the driving member, pawl and ratchet means for accurately positioning the driven member of the clutch after each operation of the shears.

29. In a machine of the class described, means for continuously forming a continuous strip of material, a shears for severing the strip into sections of equal length, driving means, a connection between the shears and the driving means comprising a normally open clutch having a driven member and a driving member, the former of which is movable toward and from the driving member, means for shifting the driven member into and out of engagement with the driving member, means for accurately positioning the driven member of the clutch after each operation of the shears, comprising a friction brake, and means for operating the same when the clutch is thrown into open position.

30. In a machine of the class described, means for continuously forming a continuous strip of material, a shears for severing the strip into sections of equal length, driving means, a connection between the shears and the driving means comprising a normally open clutch having a driving member and a driven member, the latter of which is movable toward and from the driving member, means for shifting the driven member into and out of engagement with the driving member, means for accurately positioning the shiftable member of the clutch after each operation of the shears comprising a friction drum connected thereto, a band coöperating with the drum, and means for simultaneously withdrawing the shiftable member of the clutch for engagement with the driving member, and applying the band to the drum.

31. In a machine of the class described, and in combination with the means for continuously forming a continuous strip of material, means for shearing said strip at predetermined intervals, comprising a shears, continuously operated driving means, means for intermittently connecting the driving means to the shears comprising a shaft connected to the shears for operating the same, a clutch mounted on the shaft comprising a driving and a driven member, the latter adjustable longitudinally of the shaft, a spring tending to force the driven member of the clutch into contact with the driving member, a lever normally maintaining the driven member out of contact with the driving member, a latch for normally maintaining the lever with the clutch in open position, a controller for normally maintaining the latch in operative position but permitting it periodically to retreat therefrom, a cam on the shaft adapted to engage the lever to restore it to open position against the pressure of the spring, a brake drum mounted on the shaft, a brake band engaging the drum, and means operated by the cam which operates the lever for at the same time operating the brake band to cause it to engage the disk.

32. In a machine of the class described, and in combination with the means for continuously forming a continuous strip of material, means for shearing said strip at predetermined intervals comprising a shears, continuously operated driving means, means for intermittently connecting the driving means to the shears comprising a shaft connected to the shears for operating the same, a clutch mounted on the shaft comprising a driving and a driven member, the latter adjustable longitudinally of the shaft, a spring tending to force the driven member of the clutch into contact with the driving member, a lever normally maintaining the driven member out of contact with the driving member, a latch for normally maintaining the lever with the clutch in open position, a controller for normally maintaining the latch in operative position but permitting it periodically to retreat therefrom, a cam on the shaft adapted to engage the lever to restore it to open position against the pressure of the spring, a brake drum mounted on the shaft, a brake band engaging the drum, a rotary bolt having an arm attached to the brake band, a second arm, a reciprocating bolt connected to said second arm and extending into the path of the lever whereby operation of the lever in opening the clutch will operate the brake band to cause it to engage the drum.

33. In a machine of the class described and in combination with means for continuously forming a continuous strip of material, a shears for severing the material into predetermined lengths, means for operating the shears comprising a continuously driven shaft and connections therefrom to the shears, comprising a rotary shaft, a clutch mounted thereon consisting of a driving member and a driven member movable upon the shaft toward and from the driving member, means for causing the driven member to engage the driving member at predetermined intervals and to be released therefrom, means for restoring the shaft and driven member of the clutch to a definite position comprising a ratchet wheel mounted on the shaft and having a discontinuous series of teeth, a ratchet for engaging such teeth, a pawl engaging the ratchet, and means operated from the driving member of the clutch for continuously operating said pawl.

34. In a machine of the class described, means for continuously forming a continuous strip of material, a shears for severing the strip into predetermined equal lengths, a driving means, a connection between the driving means comprising a shaft, a clutch mounted on the shaft consisting of a driving and a driven member, the latter adjustable toward and from the driving member, means for arresting the shaft and driven member when released from the driving member within a definite arc, and means for restoring the shaft and driven clutch member to a predetermined position when released from the driving clutch member.

35. In a machine of the class described, means for continuously forming a continuous strip of material, a shears for severing the strip into predetermined equal lengths, a driving means, a connection between the driving means comprising a shaft, a clutch mounted on the shaft consisting of a driving and a driven member, the latter adjustable toward and from the driving member, means for arresting the shaft and driven member when released from the driving member within a definite arc, means for restoring the shaft and driven clutch member to a predetermined position when released from the driving clutch member, comprising a discontinuous ratchet on the shaft, and a pawl driven by the driving member of the clutch coöperating with the ratchet.

36. In a machine of the class described and in combination with a continuously operating means for producing a continuous strip of material, a shears for severing the strip of material, a driving means for the shears, normally inoperative connections between the driving means and shears comprising a shaft, a clutch mounted on the shaft consisting of a driving and driven member, a brake for arresting the movement of the driven member and shaft when released from the driving member, a ratchet disk having a discontinuous series of teeth on the periphery thereof, a gear mounted on the driving member of the clutch, a pinion driven by said gear and mounted upon a shaft, a pivoted pawl arm, connections from the last said shaft for driving the pawl arm, and a pawl carried by the pawl arm engaging the ratchet disk.

37. In a machine of the class described, means for pasting the crowns of a corrugated strip of paper, means for feeding such strip to the pasting means, a pair of belts of lagging of heat-conducting material adapted to receive the material from the pasting means and to move therewith without substantial movement relative thereto, and heating means comprising steam boxes arranged longitudinally of said belts and between which said belts run and by which they are directly heated.

MELVAN L. TWOMLEY.

Witnesses:
 JOHN B. MACAULEY,
 ROBERT DOBBERMAN.